(12) United States Patent
Eckstein et al.

(10) Patent No.: US 8,348,348 B2
(45) Date of Patent: Jan. 8, 2013

(54) HEADREST FOR A VEHICLE SEAT

(75) Inventors: Alexander Eckstein, Hessicsch-Oldendorf (DE); Bennet Luck, Hannover (DE)

(73) Assignee: Autoflug GmbH (DE)

( * ) Notice: Subject to any disclaimer, the term of this patent is extended or adjusted under 35 U.S.C. 154(b) by 434 days.

(21) Appl. No.: 12/640,204

(22) Filed: Dec. 17, 2009

(65) Prior Publication Data

US 2011/0109144 A1    May 12, 2011

(30) Foreign Application Priority Data

Nov. 6, 2009  (DE) .......................... 10 2009 053 211

(51) Int. Cl.
*A47C 7/36* (2006.01)
(52) U.S. Cl. ........................................ 297/409; 297/404
(58) Field of Classification Search ................. 297/404, 297/406, 409, 383
See application file for complete search history.

(56) References Cited

U.S. PATENT DOCUMENTS

| | | | | |
|---|---|---|---|---|
| 1,471,168 | A | * | 10/1923 | Katz .............................. 297/404 |
| 4,191,422 | A | * | 3/1980 | Inasawa et al. ............... 297/409 |
| 4,856,848 | A | * | 8/1989 | O'Sullivan et al. ........... 297/409 |
| 7,073,863 | B1 | * | 7/2006 | Low et al. ..................... 297/404 |
| 7,631,932 | B2 | | 12/2009 | Hoffmann |
| 2009/0058162 | A1 | * | 3/2009 | Boes et al. ................ 297/406 X |

* cited by examiner

*Primary Examiner* — Anthony D Barfield
(74) *Attorney, Agent, or Firm* — Robert Becker; Becker & Stachniak, P.C.

(57) ABSTRACT

A headrest for a vehicle. A supporting body is mounted on a backrest of the seat, and a head support is adjustable and arrestable relative to the supporting body along a horizontal axis. The headrest includes a first arresting mechanism and second arresting mechanism that is disposed parallel to the horizontal axis and is provided with arresting stages. For an arresting of the head support on the supporting body, the first arresting mechanism is configured to engage into the second arresting mechanism under the effect of a biasing force. The first arresting mechanism is further configured such that it can travel over an angle of rotation about the horizontal axis counter to the biasing force.

9 Claims, 4 Drawing Sheets

US 8,348,348 B2

HEADREST FOR A VEHICLE SEAT

BACKGROUND OF THE INVENTION

The instant application should be granted the priority date of Nov. 6, 2009, the filing date of the corresponding German patent application 10 2009 053 211.0.

The present invention relates to a headrest for a vehicle seat.

Such a headrest is disclosed in U.S. Pat. No. 7,631,932 B2. This headrest has a support that is mounted via two guides so as to be adjustable in height on a backrest. Connected with the support is a head support in the form of a cushion support that is horizontally adjustable relative to the support. For this purpose, provided in the head support are slide rods that are oriented parallel to one another and in the direction of adjustment, and which are mounted in appropriate slide supports of the support. Provided parallel to the slide rods in the head support is a toothed strip, the teeth of which each have a slide surface and a locking surface. A spring-loaded pall (?) is mounted on the support so as to be pivotable in the direction of adjustment. Due to the spring effect, the pall engages in one of the spaces between the teeth of the toothed strip. Due to the shape of the tooth, the head support cannot be pushed back toward the support in this locked position, since the pall rests against the locking surface of a tooth. An adjustment of the head support relative to the support is possible only by releasing the locking action of the pall. For this purpose, a button is provided laterally on the head support. By pressing the button, the pall is unlocked via a lever mechanism, so that the head support can be pushed toward the support. The mechanism for transferring a torque via actuation of the button onto the pall is relatively complicated. An adjustment of the head support away from the support is possible without actuating the button, since with an appropriate pull on the support, the pall slides away over the slide surface of the toothed strip.

It is an object of the present invention to provide a further headrest of the aforementioned general type.

SUMMARY OF THE INVENTION

This object is inventively realized by a headrest comprising: a supporting body configured to be mounted on the backrest; a head support configured to be adjustable and arrestable along a horizontal axis relative to the supporting bogy; a first arresting means; and a second arresting means that is disposed parallel to the horizontal axis and is provided with arresting stages, wherein the arresting means, for an arresting of the head support on the supporting body, is configured to engage, under the effect of a biasing force, into the second arresting means, and wherein the first arresting means is further configured such that it can travel over an angle of rotation about the horizontal axis counter to the biasing force.

Advantageous embodiments can be found in the dependent claims.

BRIEF DESCRIPTION OF THE DRAWINGS

The invention will be explained in greater detail subsequently with the aid of exemplary embodiments. The exploded illustrations of the pertaining schematic drawings show.

DESCRIPTION OF SPECIFIC EMBODIMENTS

Figure 1:
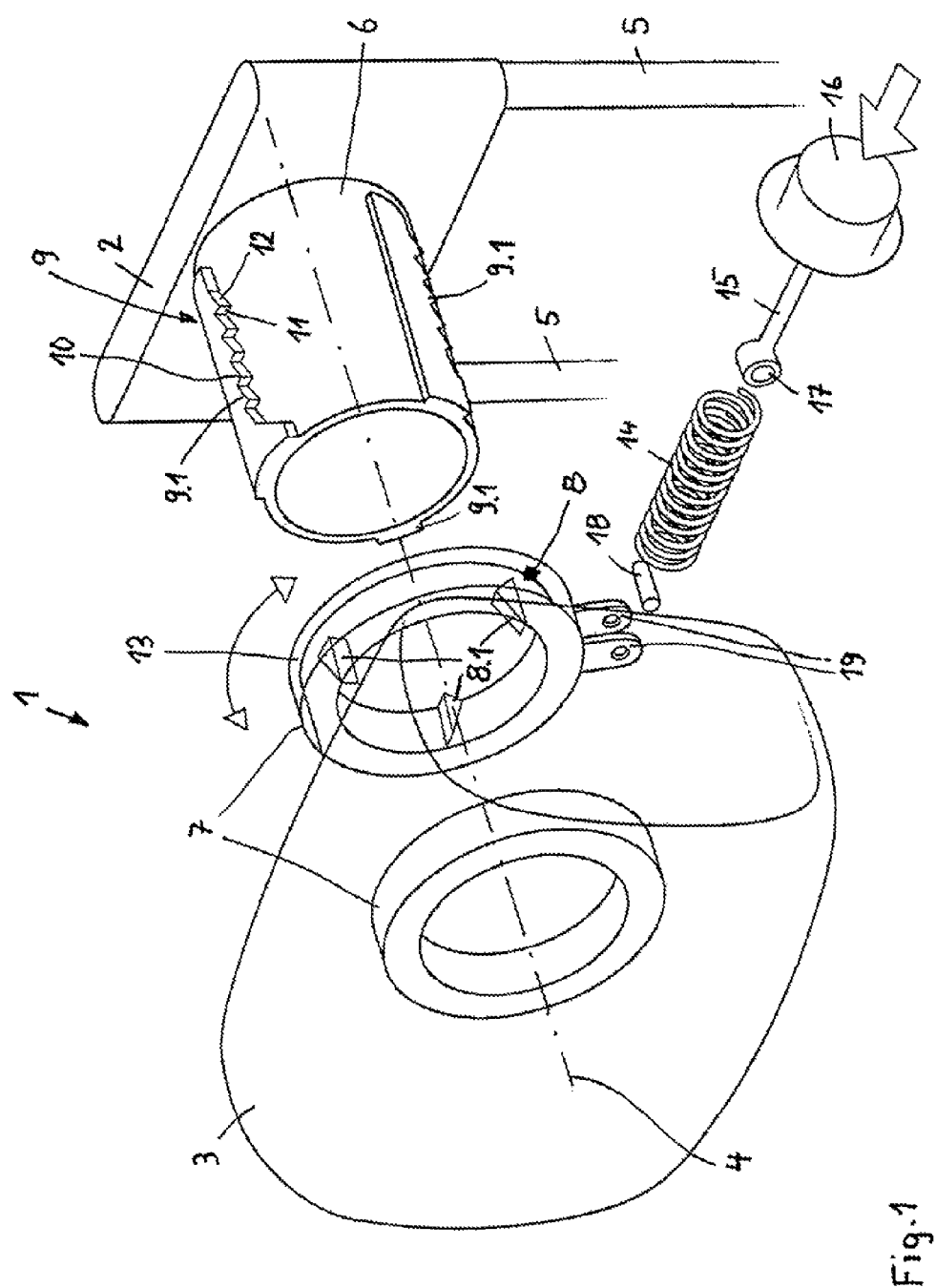
FIG. 1: a first exemplary embodiment of the present invention.

The features that are common to all of the embodiments of the invention will first be described. In this connection, it should be noted that in the drawings only those components that are functionally essential for the present invention are illustrated.

The illustrated headrest 1 for a non-illustrated vehicle seat is provided with a supporting body 2 as well as a head support 3. The head support 3 is adjustable along a horizontal axis 4 relative to the supporting body 2, and can be arrested in stages along its path of adjustment. The supporting body 2 is mounted on a backrest of the vehicle seat via two support rods 5, which are disposed parallel to one another. The supporting body 2 includes a hollow cylinder 6 that extends in the direction of the horizontal axis 4, whereby the horizontal axis 4 forms the central axis of the hollow cylinder 6. The hollow cylinder 6 cooperates with a further hollow cylinder 7, which is part of the head support 3. In the drawings, for the sake of clarity and to facilitate illustration, this hollow cylinder 7 is illustrated only with its two end regions. The central axis of the cylinder 7, in the assembled state of the headrest 1, also coincides with the horizontal axis 4.

Also part of the head support 3 are first arresting means 8, which cooperate with second arresting means 9. The arresting means 9 are disposed on the outside of the hollow cylinder 6, parallel to the horizontal axis 4, and are provided with arresting stages. The inner diameter of the hollow cylinder 7 of the head support 3 is selected such that the hollow cylinder 7 of the head support can glide telescopically over the hollow cylinder 6 of the supporting body 2. The head support 3 is pretensioned on the supporting body 2 by means of non-illustrated spring means.

In the exemplary embodiment of FIG. 1, the second arresting means 9 are embodied in the form of toothed strips 9.1, whereby three toothed strips 9.1 are provided that, respectively offset by 120 degrees, are disposed on the periphery of the hollow cylinder 6. Each toothed strip 9.1 is provided with teeth 10, whereby each tooth 10 represents an arresting step or stage along the path of adjustment of the head support 3 relative to the supporting body 2. Each tooth 10 has an arresting surface 11 as well as a glide surface 12. With this embodiment, the first arresting means 8 is disposed on the inner diameter of a ring 13, which is mounted on the hollow cylinder 7 such that it can travel or deflect over an angel of rotation. In this case, the arresting means 8 are comprised of arresting wedges 8.1 that are disposed on the inner periphery of the ring 13, again offset by 120 degrees.

The ring 13 is under the bias of a spring 14, and in particular such that the arresting wedges 8.1, in the circumferential direction, are pressed into the toothed strips 9.1 in an arresting manner. The spring 14 is concentrically seated on a plunger or pressing rod 15, which is part of a control knob 16 that is guided in a side part of the head support 3. The end 17 of the pressing rod 15 is suspended via a pin 18 in side pieces or tongues 19 that are rigidly connected with the ring 13. One end of the compression spring 14 is supported against the control knob 16, while the other end thereof is supported against a non-illustrated abutment on the head support.

The adjustment of the above-described headrest 1 in the direction of the horizontal axis 4 is undertaken as follows: the starting point is the closest position of the head support 3 relative to the supporting body 2, i.e. the head support 3 is disposed at the start of its path of adjustment. If an occupant of the seat, starting from this starting position, wishes to shift the head support 3 toward the front, he or she pulls the head support in the direction of the horizontal axis 4. As a result of this pulling, the arresting wedges 8.1 glide upon the glide surfaces 12 of the teeth 10. During this gliding movement of the arresting wedges 8.1 along the tooth strips 9.1, the biasing force or pretension of the spring 14 is overcome. In the desired position of adjustment, the arresting wedges 8.1 catch behind the respectively reached arresting surfaces 11 of the toothed strips 9.1. The head support 3 can now no longer be pushed toward the rear toward the supporting body 2.

The initially mentioned axial spring means for the biasing of the head support 3 on the supporting body 2, together with the compression spring 14, ensure a rattle-free seating of the head support 3 on the supporting body 2. To prevent a rotation of the head support 3 relative to the supporting body 2, non-illustrated, telescopically operating axial guides are provided on the supporting body 2 and on the head support 3.

If the head support 3 is to be adjusted toward the supporting body 2, the control knob 16 must be actuated. As a result, a torque is applied to the ring 13, so that the arresting wedges 8.1 are freed from the toothed strips 9.1. The head support 3 can now be pushed until the desired position is reached. After the control knob 16 is released, the arresting wedges 8.1 again interengage with the toothed strips 9.1.

Figure 2:
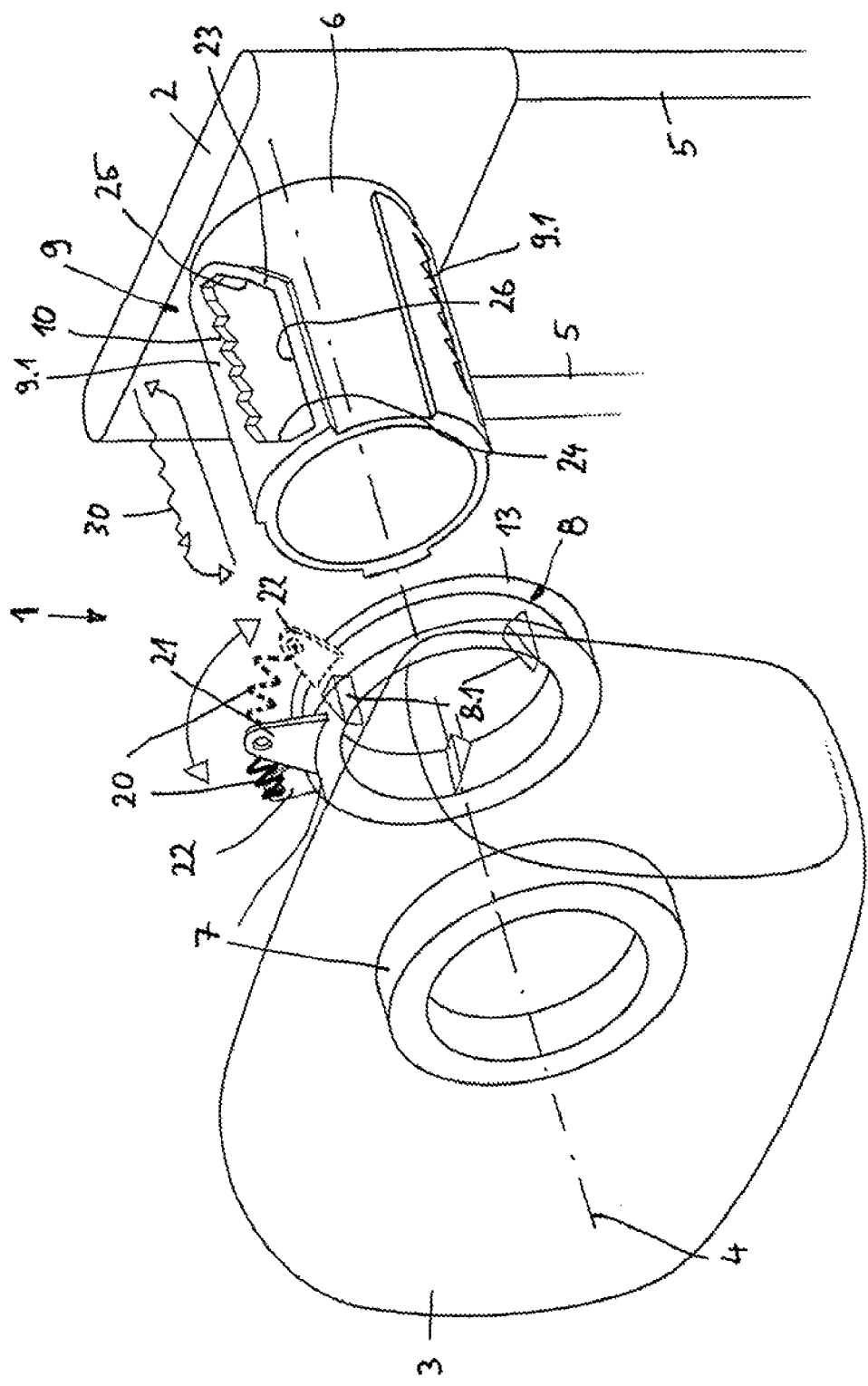
FIG. 2: a second exemplary embodiment of the present invention.

FIG. 2 illustrates a variant of the embodiment of FIG. 1 that operates without a control knob 16.

The first arresting means 8 and the second arresting means 9 correspond to those of the preceding embodiment, in other words, are embodied as arresting wedges 8.1 and toothed strips 9.1 respectively. Also here is the ring 13 that is provided with the arresting wedges 8.1 again mounted at the end of the hollow cylinder 7 such that it can travel or deflect over an angle of rotation. The biasing force is applied to the ring 13, and hence to the arresting wedges 8.1, by means of a compression spring 20. One end of this compression spring 20 is supported on a tongue 21 that is on the head support, and its other end is supported on a tongue 22 that is on the ring. In the position shown by solid lines, the compression spring 20 presses the arresting wedges 8.1 in the circumferential direction into the toothed strips 9.1 in an arresting manner, so that the head support 3 is secured in position relative to the supporting body 2. If the head support 3 is to be adjusted toward the front, in other words moved away from the supporting body 2, the head support 3 must be pulled in the direction of the horizontal axis 4. The arresting wedges 8.1 then glide over the glide surfaces 12 of the teeth 10 of the toothed strips 9.1, whereby the biasing force applied by the compression spring 20 is overcome. When the pulling force upon the head support 3 ceases, the arresting wedges 8.1 interengage with the toothed strips 9.1 in the end position of the head support 3 that is reached.

If the head support 3 is to be displaced from a set position into a position that is closer to the supporting body, this cannot be achieved directly as was possible with the preceding embodiment; rather, the head support 3 must first be pulled all the way to the end of its path of adjustment, in other words, to the maximum distance from the supporting body 2. By means of this pulling, the arresting wedges 8.1 encounter a closed control slot 23, which connects the end of the toothed strips 9.1 with their beginning. The control slot or guide means 23 is comprised of an inclined cross or transfer travel surface 24, a return section 26, and an inclined return travel surface 25. Adjoining the end of the toothed strips 9.1, the control slot 23 begins with the inclined cross travel surface 24, upon which the arresting wedges 8.1 run due to the pulling force exerted upon the head support 3, as a result of which a torque is applied to the ring 13, and the ring rotates counter to the biasing of the compression spring 20 until a dead center position is reached, which exists when the tongue 22 on the ring is axially aligned with the tongue 21 on the head support. At this moment, the compression spring 20 flips over by 180 degrees and now exerts a biasing force on the ring 13 in the opposite direction. This situation is illustrated in FIG. 2 by dashed lines. Due to this biasing force, the arresting wedges 8.1 from then on rest against the control slot 23. Since the interengagement between the arresting edges 8.1 and the toothed strips 9.1 is released, the head support 3, with the arresting wedges 8.1 resting against the return section 26, can now be pressed toward the rear, i.e. toward the supporting body 2. There, the arresting wedges 8.1 run upon the inclined return travel surface 25, as a result of which the ring 13, against the effective biasing of the compression spring 20, is rotated until again the dead center position is reached. The compression spring 20 then again abruptly reverses, and now again applies a biasing force onto the ring 13 in the other direction, as a result of which the arresting wedges 8.1 are pressed into the toothed strips 9.1 in an interengaging manner. This operating sequence is symbolically illustrated in FIG. 2 by the curve 30.

Also in this embodiment there is a non-illustrated, telescopically operated axial guidance between the supporting body 2 and the head support 3.

Figure 3:
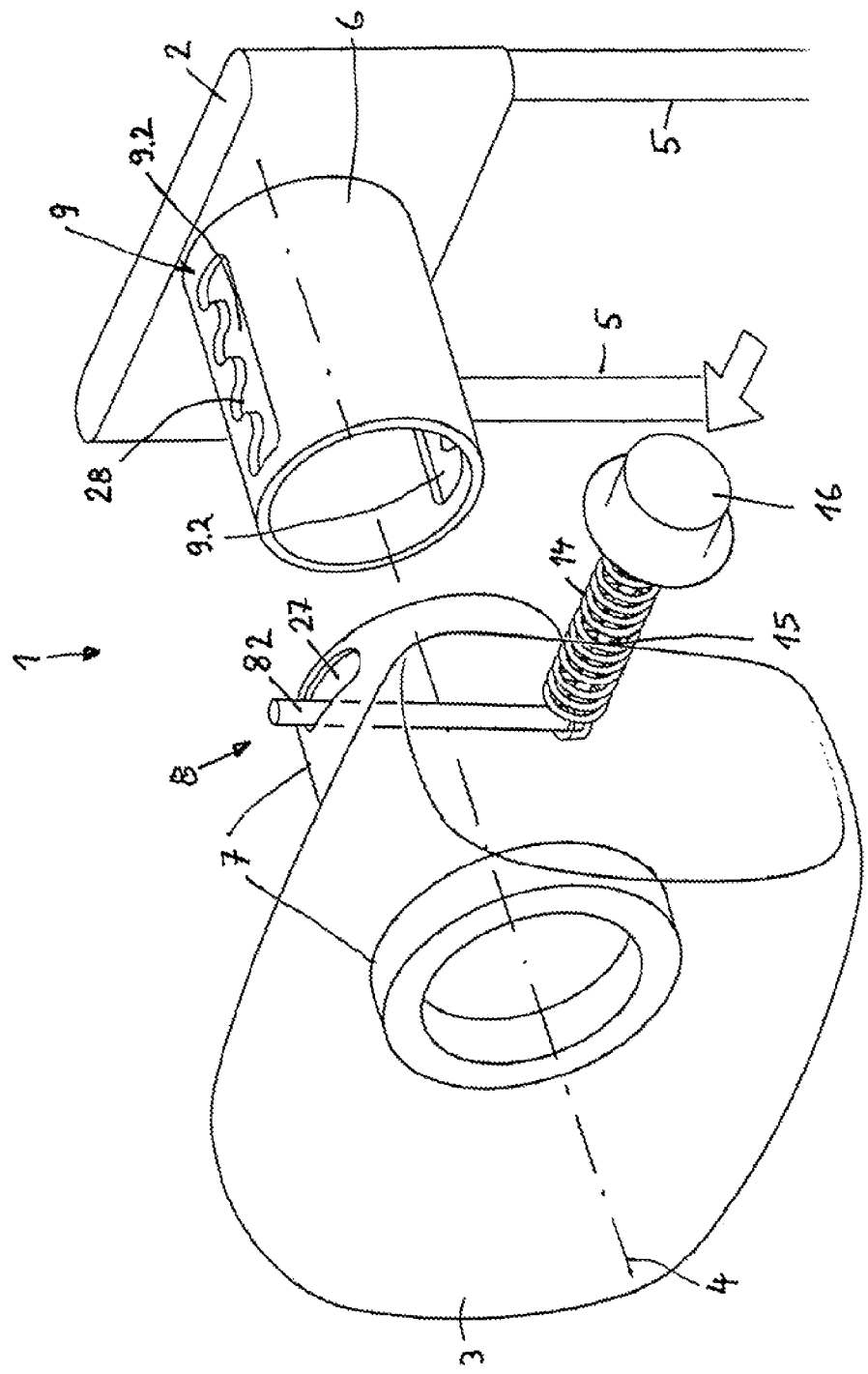
FIG. 3: a third exemplary embodiment of the present invention.

With the exemplary embodiment illustrated in FIG. 3, the first arresting means 8 is comprised of a rod 8.2, which is mounted so as to be rotatable in the circumferential direction about a non-illustrated axis of rotation that coincides with the horizontal axis 4. The rod 8.2 extends outwardly through the cylinder 7, for which purpose the cylinder is provided with slots 27 that extend in the desired deflection or travel direction of the rod 8.2.

One end of the rod 8.2 is connected with a plunger or pressing rod 15 of a control knob 16. Concentrically seated upon the pressing rod 15 is a compression spring 14. This configuration is identical to the configuration of FIG. 1, to which reference is hereby made.

The second arresting means 9 are formed by two diametrically oppositely disposed cutouts 9.2 that extend in the direction of the horizontal axis 4 and that are provided with spaced-apart indentations 28 that extend in the circumferential direction.

In the assembled state, the rod 8.2 extends not only through the slots 27 of the cylinder 7, but also through the cutouts 9.2. When the control knob 16 is not actuated, the ends of the rod 8.2 are disposed in one of the indentations 28 that form the arresting stages under the bias of the compression spring 14. If the head support 3 is to be adjusted relative to the supporting body 2 along the horizontal axis 4, the control knob 16 must be pressed. As a result, the rod 8.2 pivots and comes free from the indentations 28. The head support 3 can now be shifted toward the front or the rear, as long as the control knob 16 is held. If the control knob 16 is again released, the rod 8.2 interengages with the cutouts 9.2 provided that its ends are incident with the respectively reached indentations 28.

To prevent a rotation of the head support 3 relative to the supporting body 2, also with this embodiment non-illustrated, axial guides are provided between these two components.

Figure 4:
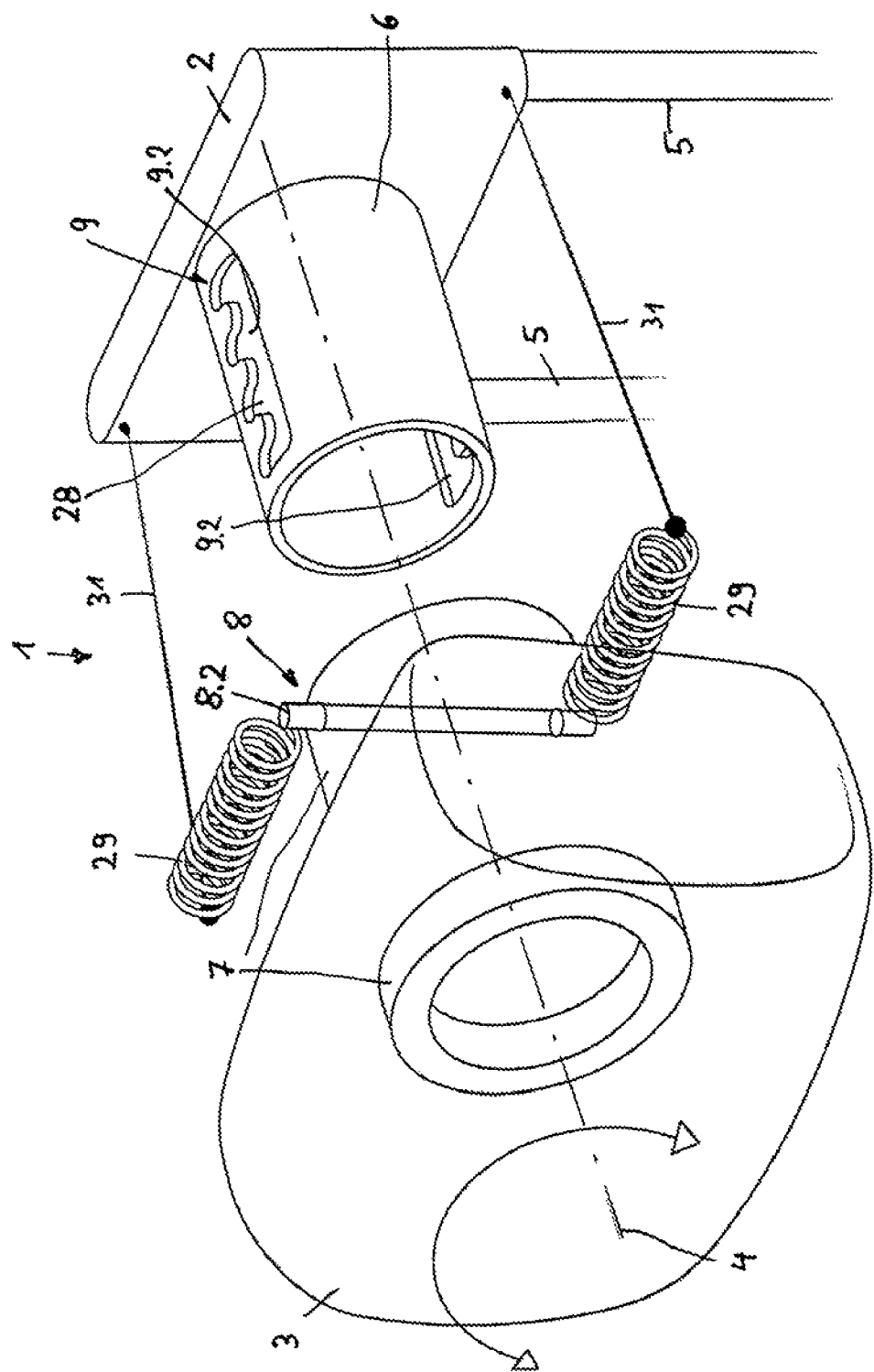
FIG. 4: a fourth exemplary embodiment of the present invention.

FIG. 4 shows a variant of the embodiment of FIG. 3, whereby the control knob 16 is eliminated. With this exemplary embodiment, the deflection or travel of the first arresting means 8 over and angle of rotation is achieved by rotating the head support 3.

Here again, the first arresting means 8 is formed by a rod 8.2 that extends through both sides of the cylinder 7; however, in contrast to the preceding embodiment, here the rod is rigidly connected with the cylinder 7. The second arresting means 9 in this embodiment are identical with those of the preceding embodiment, in other words, are also embodied as cutouts 9.2 having the indentations 28 that form the arresting stages.

In the installed state of the headrest 1, the ends of the rod 8.2 extend through the cutouts 9.2 in the cylinder 6 of the supporting body 2. Suspended in the two ends of the rod 8.2 are tension springs 29, the other ends of which are suspended in components on the supporting body, as symbolically indicated by the lines 31. Due to the effect of the tension springs 29, the ends of the rod 8.2 are disposed in the indentations 28 of the cutouts 9.2. If an adjustment of the head support 3 relative to the supporting body 2 along the horizontal axis 4 is desired, the head support 3 is rotated slightly against the effect of the tension springs 29, so that the ends of the rod 8.2 come free from the indentations 28. The head support 3, in this slightly rotated position, can now be pushed toward the front or toward the rear. After the head support 3 is released, the tension springs 29 again pull the rod 8.2 into one of the indentations 28, so that the head support 3 is fixed in position relative to the supporting body 2.

The specification incorporates by reference the disclosure of German 10 2009 053 211.0 filed Nov. 6, 2009.

The present invention is, of course, in no way restricted to the specific disclosure of the specification and drawings, but also encompasses any modifications within the scope of the appended claims.

The invention claimed is:

1. A headrest for a vehicle seat having a backrest, comprising:
    a supporting body configured to be mounted on the backrest;
    a head support configured to be adjustable and arrestable relative to said supporting body along a horizontal axis, a first arresting means; and
    a second arresting means, wherein said second arresting means is disposed parallel to said horizontal axis and is provided with arresting stages, further wherein said first arresting means, for an arresting of said head support on said supporting body, is configure to engage into said second arresting means under the effect of a biasing force, further wherein said first arresting means is further configured such that it can travel over an angle of rotation about said horizontal axis counter to said biasing force, and wherein an interengagement between said first arresting means and said second arresting means is releasable in stages by means of a pull applied to said head support in the direction of said horizontal axis.

2. A headrest according to claim 1, wherein said first arresting means (8) is formed on said head support, and wherein said second arresting means is formed on said supporting body.

3. A headrest according to claim 2, wherein a hollow cylinder is provided that extends from said supporting body in the direction of said horizontal axis, and wherein said second arresting means is formed on said hollow cylinder.

4. A headrest according to claim 3, wherein a hollow cylinder is provided that extends from said head support in the direction of said horizontal axis, further wherein said hollow cylinder of said head support is configured to be telescopically placed on said hollow cylinder of said supporting body, and wherein said first arresting means is formed on said hollow cylinder of said head support.

5. A headrest according to claim 4, wherein a ring is provided that is seated on said hollow cylinder of said head support such that it can travel over an angle of rotation, and wherein said first arresting means is formed on said ring.

6. A headrest according to claim 4, wherein said head support is mounted on said supporting body so as to be rotatable about said horizontal axis, and wherein an interengagement between said first arresting means and said second arresting means, in each stage of a path of adjustment of said head support, is releasable by means of a travel of said head support over an angle of rotation.

7. A headrest according to claim 4, wherein an actuating means is provided, and wherein an interengagement between said first arresting means and said second arresting means, in each stage of a path of adjustment of said head support, is releasable by means of a torque transferrable to said first arresting means via said actuating means.

8. A headrest according to claim 1, wherein said interengagement between said first arresting means and said second arresting means is additionally releasable at the end of a path of adjustment of said head support by means of a positive cross travel of said first arresting means that reverses said biasing force, further wherein said interengagement can again be established by means of a positive return travel at the start of the path of adjustment of said head support, further wherein said positive cross travel is adapted to be realized by a pull on said head support, and wherein said positive return travel is adapted to be realized by pressure against said head support.

9. A headrest according to claim 1, wherein an actuating means is provided, and wherein said interengagement between said first arresting means and said second arresting means, in each stage of a path of adjustment of said head support, is additionally releasable by means of a torque that is transferrable to said first arresting means via said actuating means.

* * * * *